US009144816B2

(12) United States Patent
Lewis et al.

(10) Patent No.: US 9,144,816 B2
(45) Date of Patent: Sep. 29, 2015

(54) CARRIER SYSTEMS FOR COATING PANELS

(75) Inventors: Mark D. Lewis, Fairview Park, OH (US); Walter J. Robertson, Pittsburgh, PA (US); Mary Park, Medina, OH (US); Nathan Goodnow, Harmony, PA (US); Joseph S. Szul, Jr., Canfield, OH (US); Jason DeWeese, Evansville, IN (US)

(73) Assignee: PPG Industries Ohio, Inc., Cleveland, OH (US)

( * ) Notice: Subject to any disclaimer, the term of this patent is extended or adjusted under 35 U.S.C. 154(b) by 690 days.

(21) Appl. No.: 13/327,903

(22) Filed: Dec. 16, 2011
(Under 37 CFR 1.47)

(65) Prior Publication Data

US 2013/0156957 A1 Jun. 20, 2013

(51) Int. Cl.

*B23Q 3/00* (2006.01)
*B05B 13/02* (2006.01)
*B05B 15/04* (2006.01)

(52) U.S. Cl.

CPC ............... *B05B 13/02* (2013.01); *B05B 15/045* (2013.01)

(58) Field of Classification Search

USPC ....... 269/289 R, 292, 295; 118/213, 301, 504
See application file for complete search history.

(56) References Cited

U.S. PATENT DOCUMENTS

| | | | | |
|---|---|---|---|---|
| 4,755,273 | A * | 7/1988 | Bassett et al. | 204/622 |
| 6,135,050 | A * | 10/2000 | Inaba et al. | 118/301 |
| 6,355,103 | B1 * | 3/2002 | Inaba et al. | 118/504 |
| 7,790,004 | B2 * | 9/2010 | Seddon | 204/298.15 |
| 2011/0203521 | A1 | 8/2011 | Ogawa et al. | |

FOREIGN PATENT DOCUMENTS

WO 2008045710 A2 4/2008

* cited by examiner

*Primary Examiner* — Lee D Wilson
*Assistant Examiner* — Shantese McDonald
(74) *Attorney, Agent, or Firm* — Alan Towner

(57) ABSTRACT

A panel carrier system and method for coating panels with the carrier system are disclosed. The carrier comprises a base and protective cover with an enclosure that protects the base when coating compositions are applied to the panels. The carrier system and coated panels may be transported to a curing location, followed by removal and evaluation of the coated panels.

49 Claims, 12 Drawing Sheets

CARRIER SYSTEMS FOR COATING PANELS

FIELD OF THE INVENTION

The present invention relates to carrier systems for coating panels.

BACKGROUND OF THE INVENTION

Application and evaluation of various types of coatings are performed in many industries. For example, in refinish operations, selected coating formulations are applied to panels for evaluation. Current refinish color lab processes use manual techniques for performing the steps of mixing coating compositions, spraying test panels with the coating compositions, transporting the sprayed test panels, curing the panels and measuring the characteristics of the cured coatings on the panels. Panels to be sprayed are mounted on a fixture, and in some applications, masking tape may be applied to the fixture to eliminate build up of overspray paint. A spray gun may be loaded with the desired paint formulation, followed by spraying of the panels with the coating composition. A technician may then manually remove the freshly sprayed panels from the fixture and place them on a rack to flash or set up for a short period of time, e.g., 60 seconds. The panels may then be placed into a curing oven to fully cure the coatings, followed by cooling to room temperature. This process may be repeated when applying multiple coatings on panels, e.g., a base coat and a clear coat. The coated panels may then be evaluated, for example, using a spectrophotometer to characterize the color of the panel.

SUMMARY OF THE INVENTION

An aspect of the invention provides a carrier for coating panels comprising a base including at least one support pedestal structured and arranged to support a panel and a grip region, and a protective cover comprising a protective enclosure adjacent the grip region.

Another aspect of the invention provides a method of coating panels comprising mounting at least one panel on a carrier having a protective cover, applying a coating composition to the at least one panel, and curing the coating composition while the at least one panel is mounted on the carrier.

DETAILED DESCRIPTION OF EMBODIMENTS OF THE INVENTION

Figure 1:
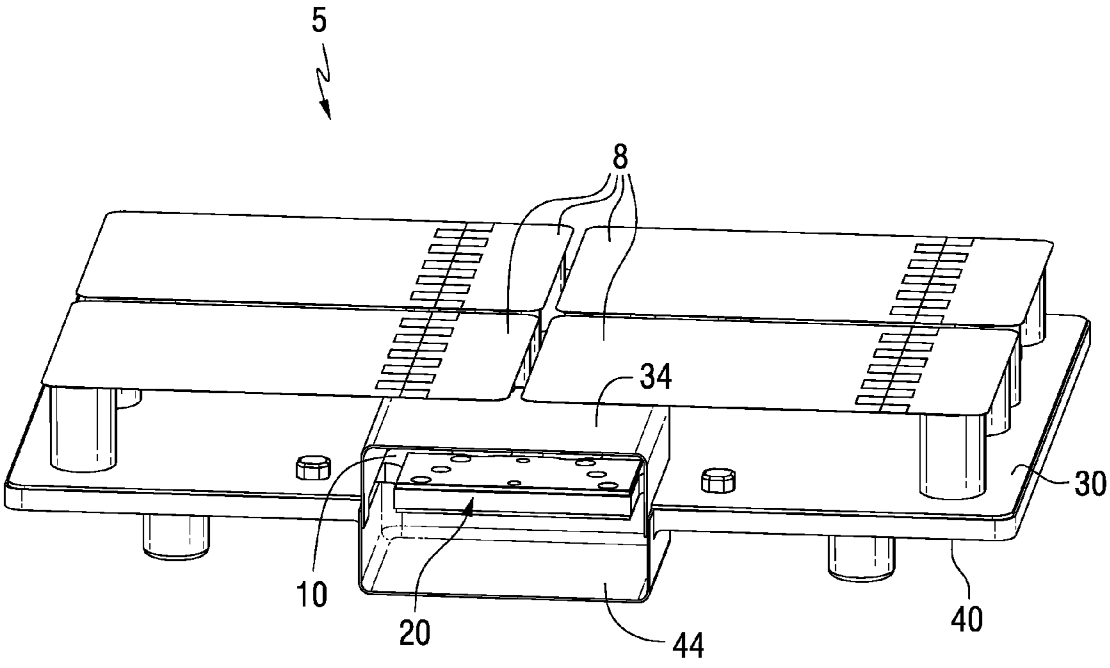
FIG. 1 is an isometric view of a carrier system including coating test panels in accordance with an embodiment of the present invention.
Figure 2:
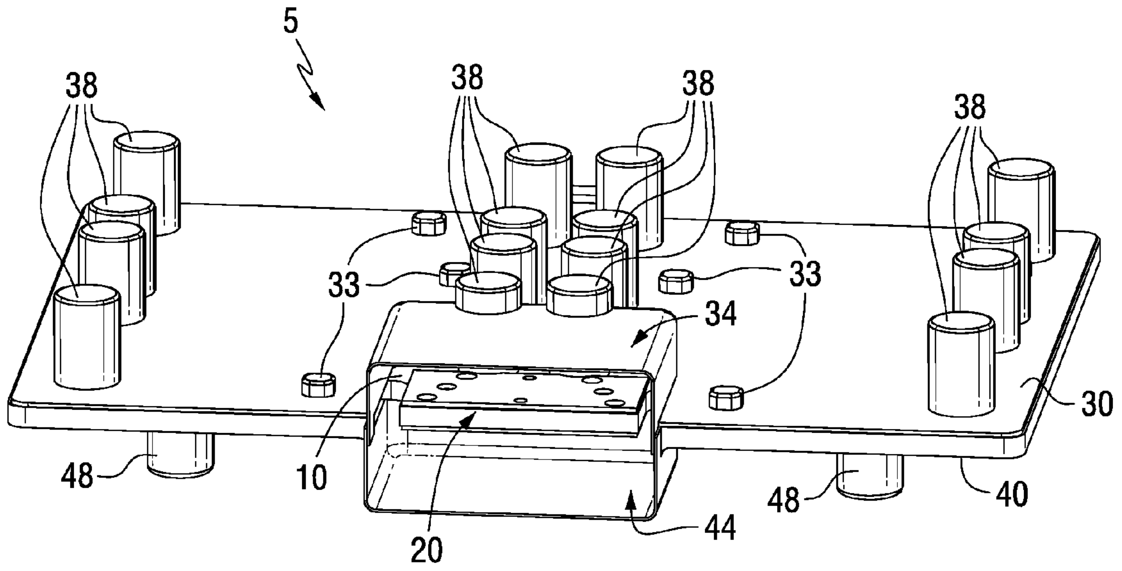
FIG. 2 is an isometric view of the carrier system shown in FIG. 1, with the panels removed.
Figure 3:
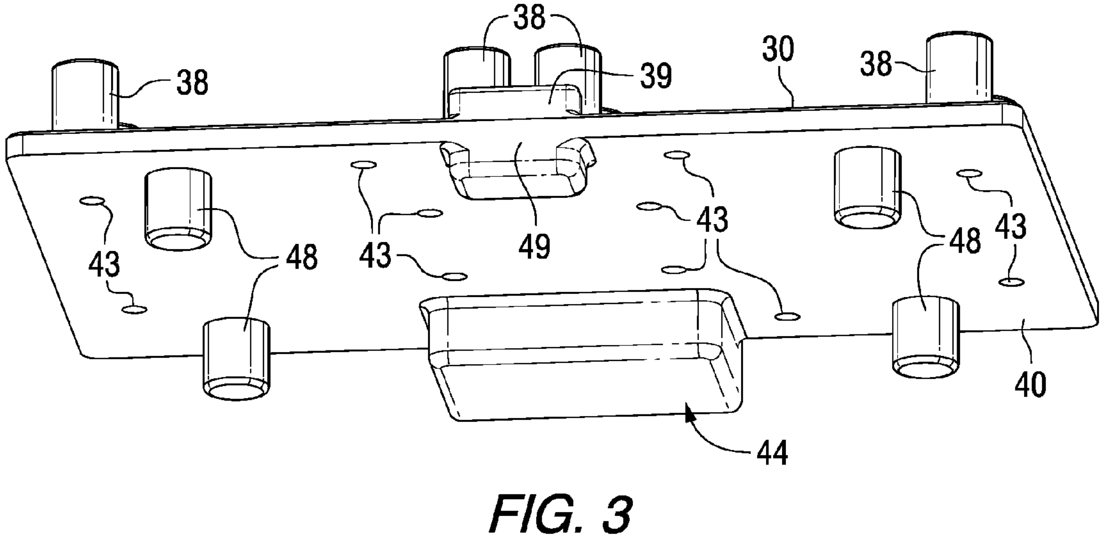
FIG. 3 is a bottom isometric view of the carrier system shown in FIG. 2.
Figure 4:
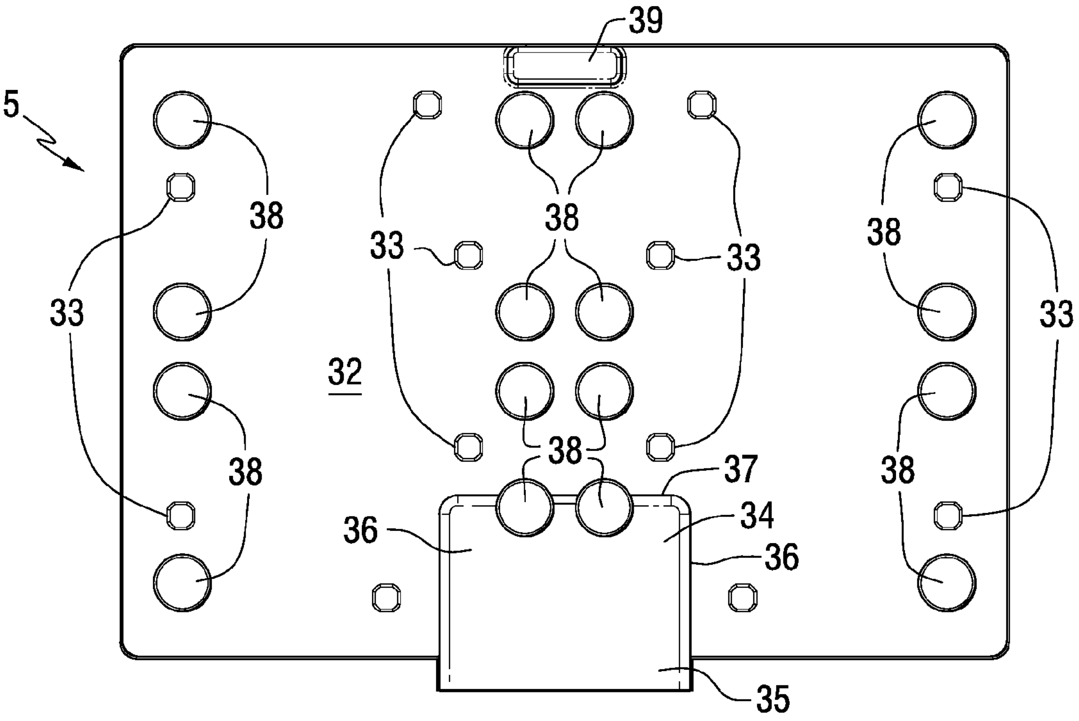
FIG. 4 is a top view.
Figure 5:
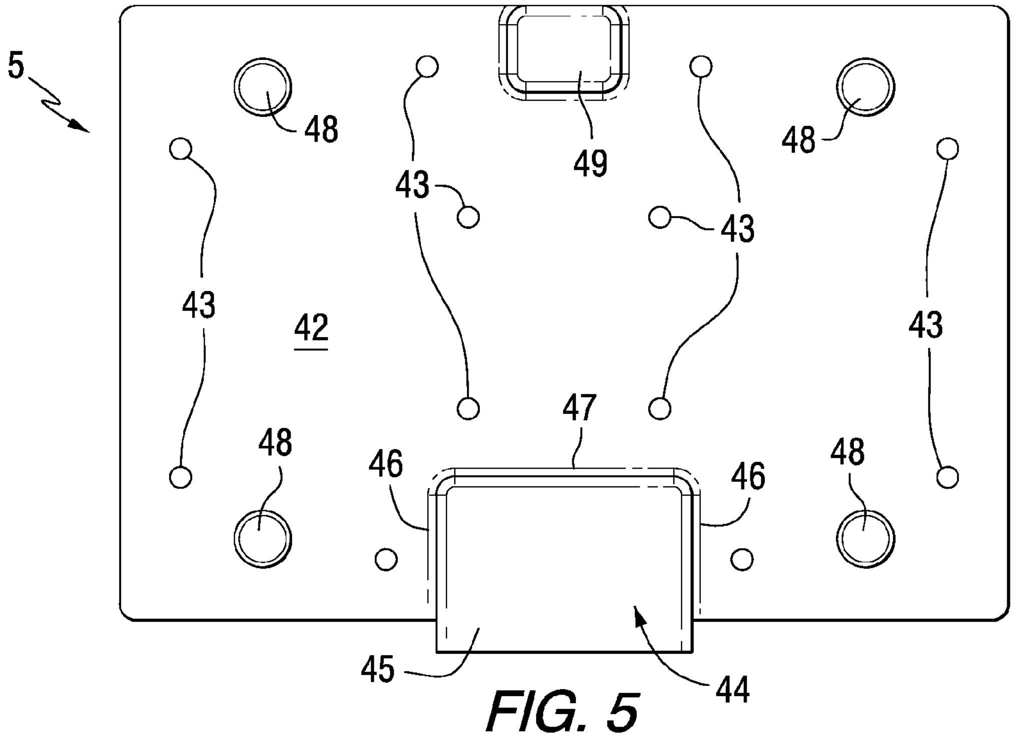
FIG. 5 is a bottom view.
Figures 6, 7, 8:
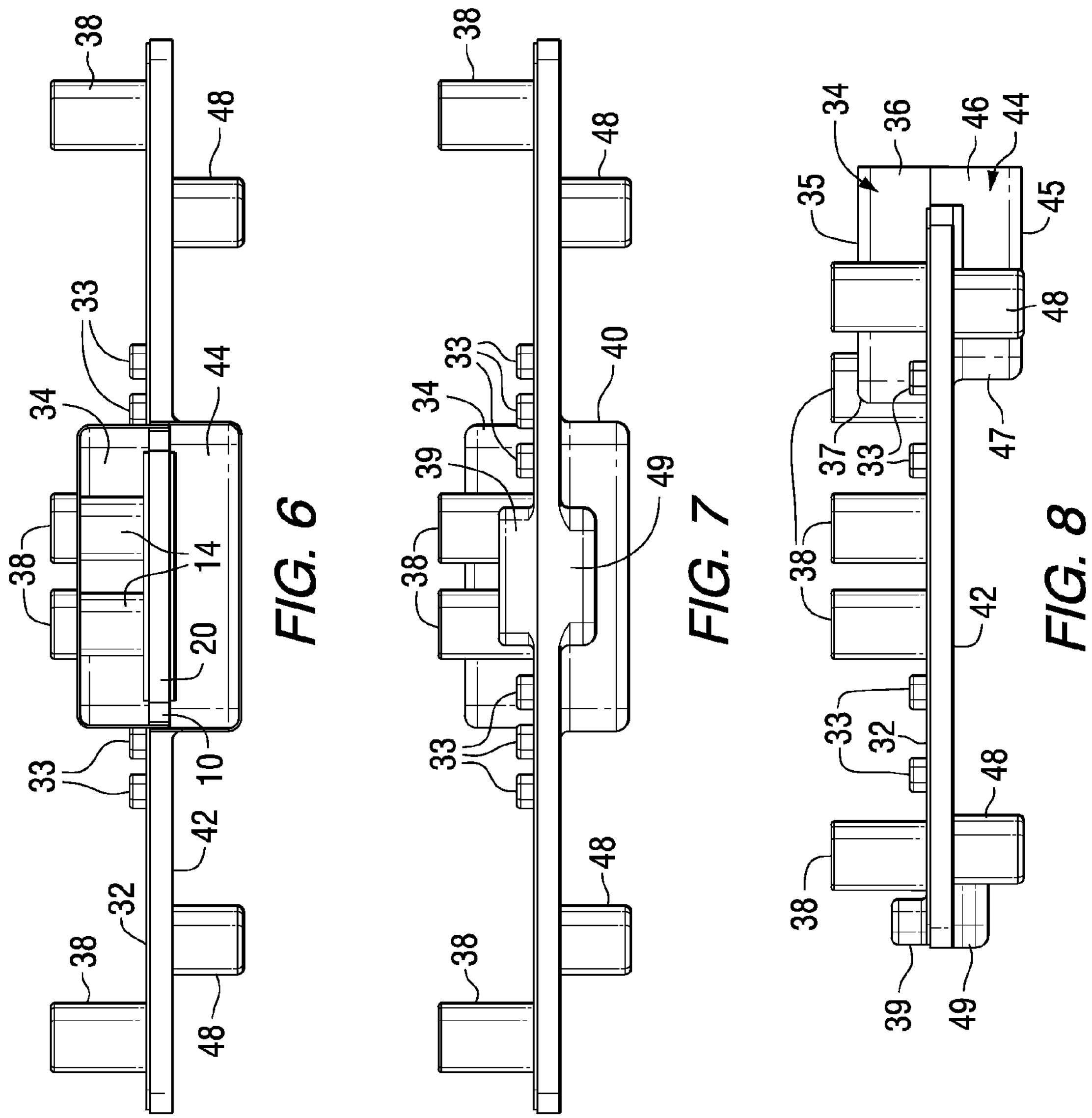
FIG. 6 is a front view.
FIG. 7 is a back view.
FIG. 8 is a side view of the carrier system shown in FIG. 2.

FIGS. 1-19 illustrate a carrier system 5 and its various components in accordance with an embodiment of the present invention. As shown in FIG. 1, the carrier system 5 supports panels 8, which may be coated with selected coating compositions and subsequently cured while mounted on the carrier 5. Four test panels 8 are shown in the embodiment of FIG. 1, however, it is to be understood that any other suitable number and type of panel(s) may be coated using the carrier system 5 of the present invention.

In certain embodiments of the invention, the panels 8 are test panels such as those used in color laboratories. Color laboratory test panels may be provided in various sizes and shapes. For example, panels having surface areas of from 1 square inch to 1 or 2 square feet or more may be used. In certain automotive refinish color laboratories, each test panel is typically rectangular with a length of from about 4 to 6 inches, a width of from about 3 to 5 inches. The panels are typically made of metal such as aluminum, steel and the like, plastic or paper. While color laboratory test panels are primarily described herein, it is to be understood that other types of panels may be coated using the present carrier systems, including automotive panels and parts, architectural panels, consumer electronics, appliances, sports and recreation equipment, aerospace panels and the like.

FIGS. 2-19 illustrate various aspects of the carrier system 5 with the panels 8 removed. As shown most clearly in the exploded view of FIG. 11, the carrier system 5 includes a carrier base 10, an upper protective cover 30, and a lower protective cover 40. In FIGS. 12-18, the upper and lower protective covers 30 and 40 have been removed from the carrier base 10. The carrier base 10 includes a base plate 12 which, in the embodiment shown, is substantially planar. The base plate 12 may comprise a solid piece of material, or a grid, lattice, screen, etc. Support pedestals 14 for mounting the panels 8 extend upward from the base plate 12. In the embodiment shown, the support pedestals 14 include magnets 16 mounted on their upper ends that are used to secure the panels 8 to the carrier base 10. In this embodiment, the panels 8 may be magnetic. In other embodiments, means other than magnets may be used for securing the panels 8 to the carrier base 10, such as mechanical fasteners, adhesives, and the like. Support legs 18 extend downward from the bottom of the base plate 12, and may be used to support the carrier system 5.

The carrier base 10 includes a grip region 20 which, in accordance with an embodiment of the invention, is used by a tool such as a robotic arm to grip and move the carrier system 5 to various desired locations. The grip region 20 includes an extended tongue 22 that projects laterally from the base plate 12. An upper grip plate 24 and a lower grip plate 25 cover at least a portion of the extended tongue 22. The carrier base 10 includes edge cut-outs 26 and several peg holes 27 that allow engagement between the upper and lower protective covers 30 and 40 in accordance with embodiments of the invention, as more fully discussed below.

The base plate 12 may be made of any suitable material such as metals, polymers, ceramics, composites and the like. The support pedestals 14 and support legs 18 may be made of any suitable material such as metals, polymers, ceramics, composites and the like. In certain embodiments, the base plate 12, support pedestals 14 and support legs 18 may be made of aluminum. The upper and lower grip plates 24 and 25 may be made of any suitable material such as wear-resistant metals, ceramics, composites and the like. For example, the grip plates 24 and 25 may comprise hardened steel.

As shown most clearly in FIGS. 13-15, 17 and 18, the carrier base 10 has a radio frequency identification (RFID) tag 28 mounted thereon. The RFID tag 28 may be used to identify the location of each carrier system, as well as provide additional information such as the number of uses, the number of applications, and panel orientations during use of the carrier system 5.

In accordance with certain embodiments of the invention as shown in FIGS. 2, 4, 6-8 and 11, the upper protective cover 30 comprises an upper base panel 32 with several peg recesses 33 and a protective enclosure 34. The protective enclosure 34 includes a top panel 35, side panels 36, and a back panel 37. As more fully described below, the protective enclosure 34 of the upper protective cover 30 protects the underlying grip region 20 of the base plate 10 from paint overspray during coating operations. In certain embodiments, the height of the protective enclosure 34, measured from the plane of the base panel 32 to the top panel 35, typically ranges from 1 to 50 mm, for example, from 5 to 20 mm. The width of the protective enclosure 34, measured between its side panels 36, typically ranges from 5 to 500 mm, for example, from 10 to 100 mm. The depth of the protective enclosure 34, measured from its front edge to the back panel 37, typically ranges from 5 to 500 mm, for example, from 10 to 100 mm. The front edge of the top panel 35 may overhang the front edge of the tongue 22 of the underlying base plate 12, for example, by a distance of from 0 to 100 mm, in certain embodiments, from 1 or 2 mm to 10 or 20 mm.

The upper protective cover 30 includes pedestal covers 38 that are structured and arranged to cover the support pedestals 14 of the carrier base 10. The upper protective cover 30 includes an RFID cover 39.

As shown most clearly in FIGS. 3, 5-8, 11 and 19, the lower protective cover 40 includes a lower base panel 42 with several attachment pegs 43 and a protective enclosure 44. The protective enclosure 44 includes a bottom panel 45, side panels 46, and a back panel 47. Leg covers 48 extending from the lower base panel 42 are structured and arranged to cover the support legs 18 of the carrier base 10. The lower protective cover 40 also includes an RFID cover 49. The height of the lower protective enclosure 44, measured from the plane of the lower base panel 42 to the bottom panel 45, typically ranges from 0 to 50 mm, for example, from 1 or 5 mm to 20 mm. The width of the lower protective enclosure 44, measured between its side panels 46, typically ranges from 5 to 500 mm, for example, from 10 to 100 mm. The depth of the lower protective enclosure 44, measured from its front edge to the back panel 47, typically ranges from 5 to 500 mm, for example, from 10 to 100 mm.

The protective covers 30 and 40 may be mounted on the carrier base 10 by any suitable means. For example, the upper protective cover 30 and/or the lower protective cover 40 may be mounted directly onto the carrier base 10. In certain embodiments, the upper and lower protective covers 30 and 40 may be secured, fastened or otherwise attached to each other. For example, the attachment pegs 43 of the lower protective cover 40 may be inserted into the peg recesses 33 of the upper protective cover 30 in order to provide a detachable snap fit or press fit between the covers.

In accordance with embodiments of the invention, at least portions of the upper and lower protective covers 30 and 40 are self-supporting. As used herein, the term "self-supporting" means that the cover, or a portion thereof, retains its shape without additional support. In certain embodiments, at least the protective enclosure 34 of the upper protective cover 30 and the protective enclosure 44 of the lower protective cover 40 are self-supporting. In this manner, the protective enclosures 34 and 44 substantially retain their shapes during use of the carrier system 5. For example, the self-supporting protective enclosures 34 and 44 substantially retain their shapes when the protective covers 30 and 40 are initially mounted on the carrier base, when the panels 8 are secured on the carrier system 5, and when the panels 8 are subsequently coated, flashed, cured or otherwise handled.

The upper and lower protective covers 30 and 40 may have thicknesses of from about 0.01 to about 5 mm, for example, from about 0.03 to about 1 mm. They may be made of any suitable materials including polymers, metals, ceramics, composites and the like. Some suitable polymeric materials include thermoset or thermoplastic polymers such as polyvinyl chloride or polyethylene and the like. In certain embodiments, the structure of the cover and the type and thickness of the material used are selected such that the cover is substantially rigid rather than being deformable or flexible. The covers may include reinforced regions to increase their structural integrity. The covers may typically be capable of withstanding elevated temperatures, for example, temperatures above 50° C. experienced during flashing operations and/or curing operations typically above 65° C.

In certain embodiments of the invention, the upper and lower protective covers 30 and 40 are disposable, i.e., they may be discarded after single or multiple coating operations. In certain other embodiments, the upper and lower protective covers 30 and 40 are reusable, and may be cleaned and reused as desired.

Figure 9:
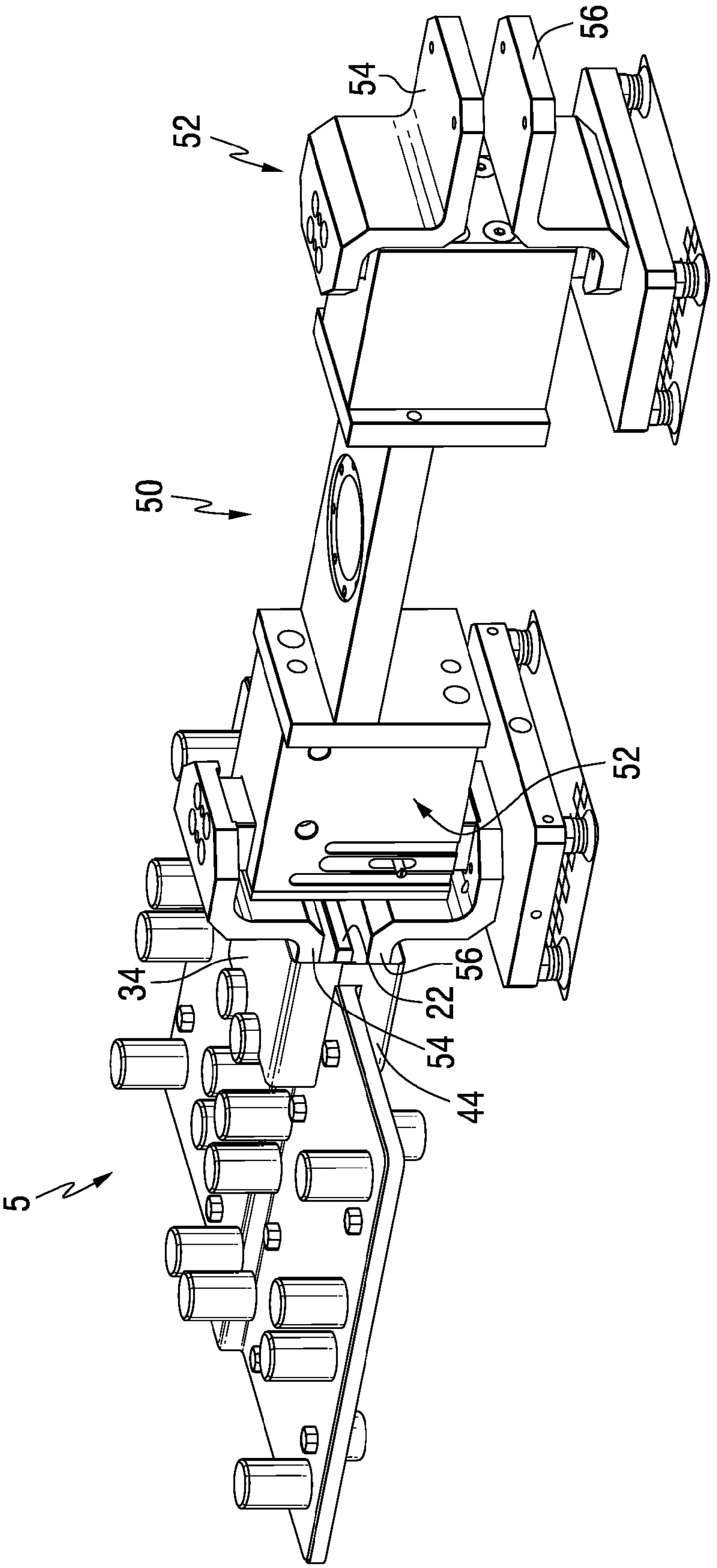
FIG. 9 is an isometric view.
Figure 10:
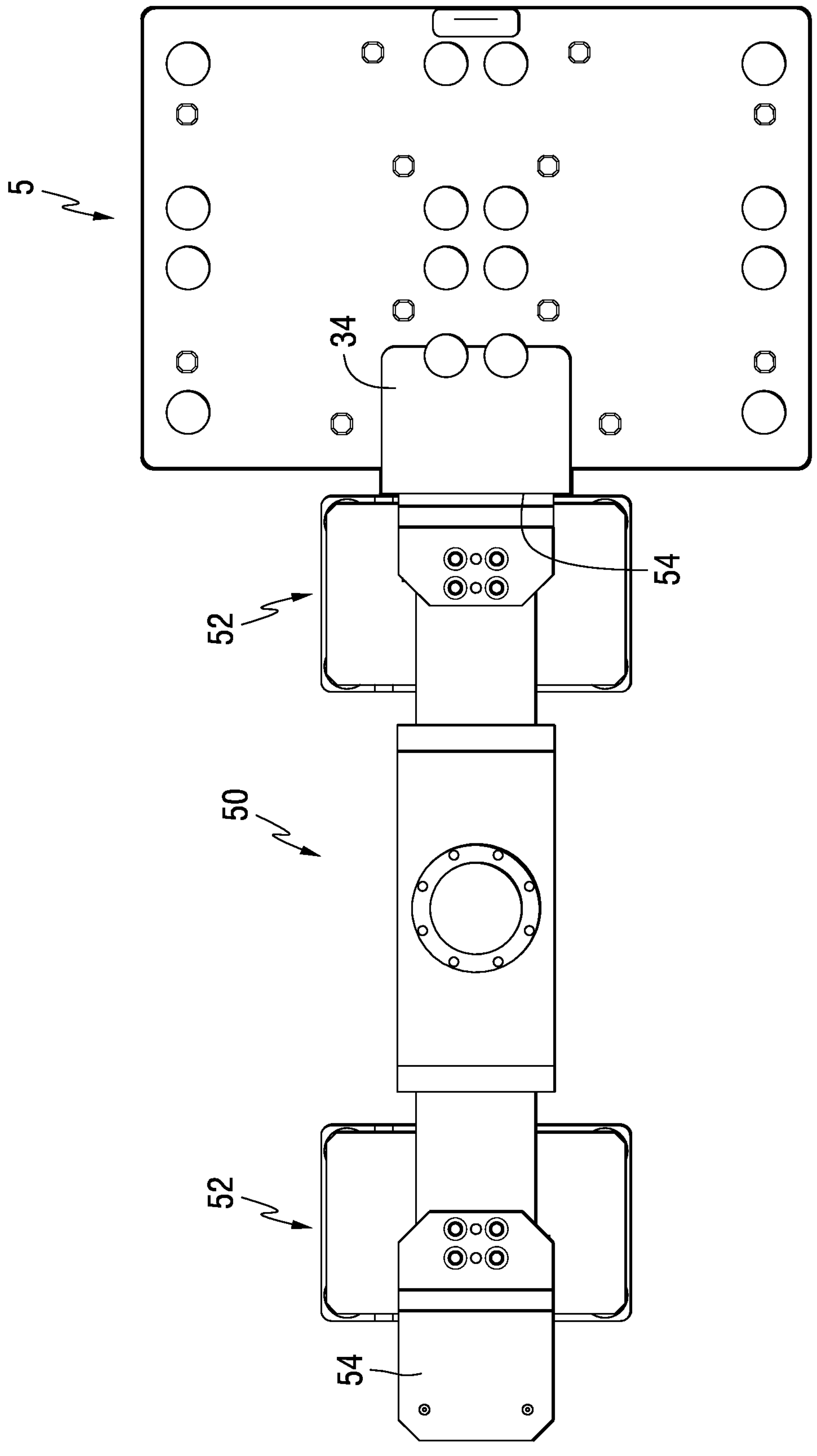
FIG. 10 is a top view of a robotic arm grasping a carrier system in accordance with an embodiment of the present invention.
Figure 11:
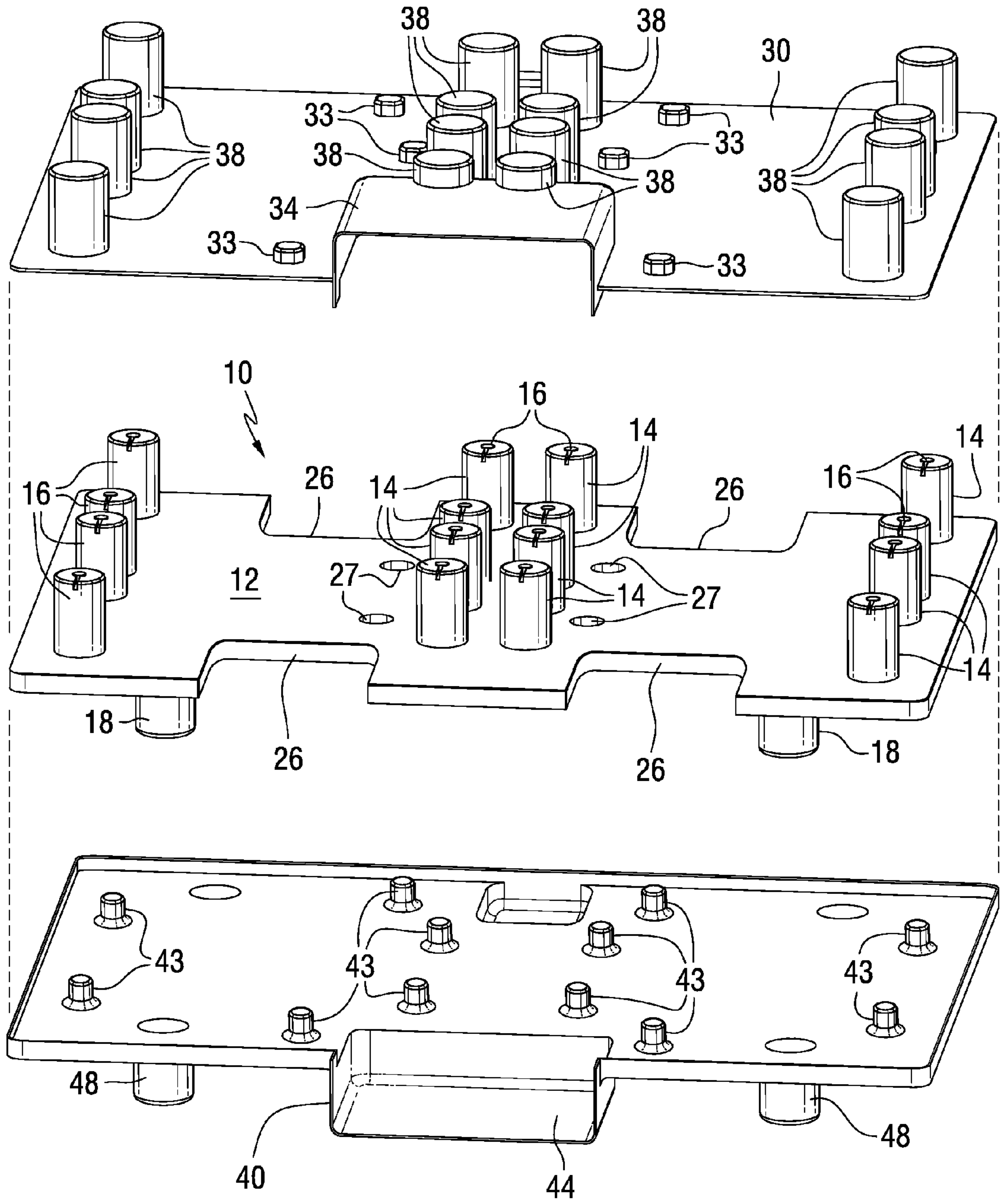
FIG. 11 is an exploded isometric view illustrating a carrier base, upper protective cover, and lower protective cover of a carrier system in accordance with an embodiment of the present invention.
Figure 12:
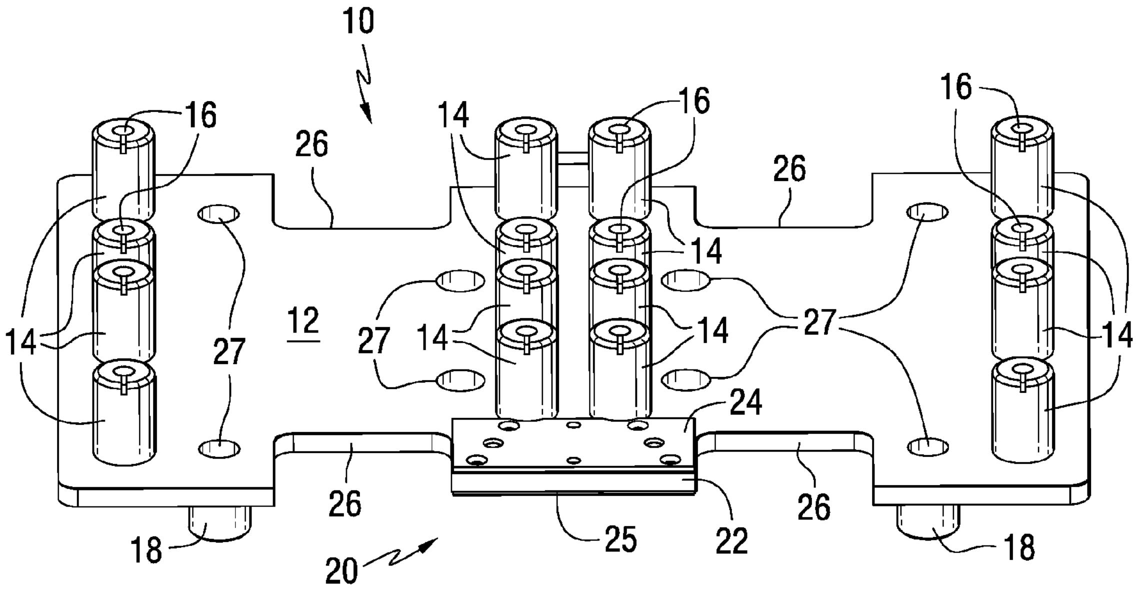
FIG. 12 is a perspective view of a carrier base in accordance with an embodiment of the present invention.
Figure 13:
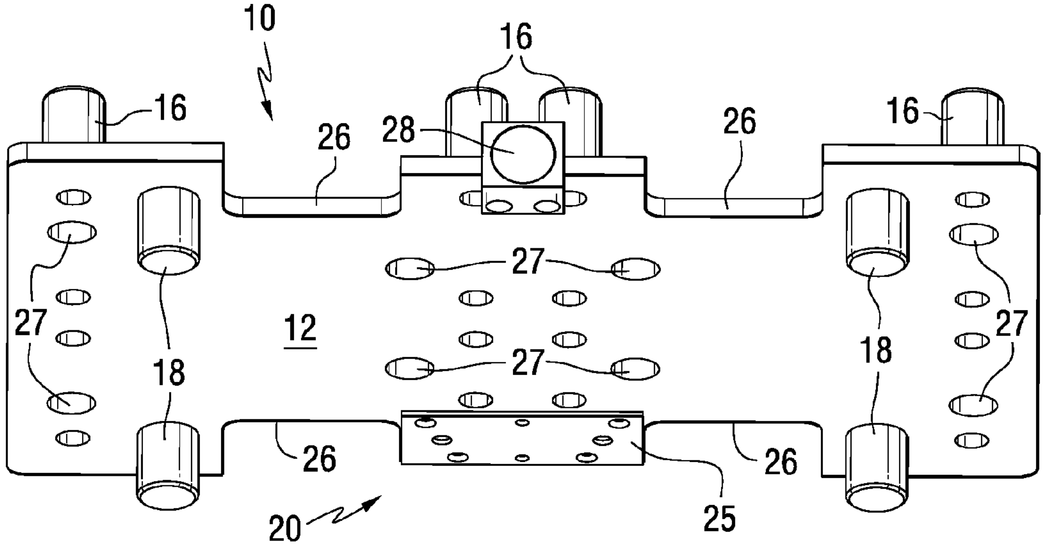
FIG. 13 is a bottom perspective view of the carrier base shown in FIG. 12.
Figure 14:
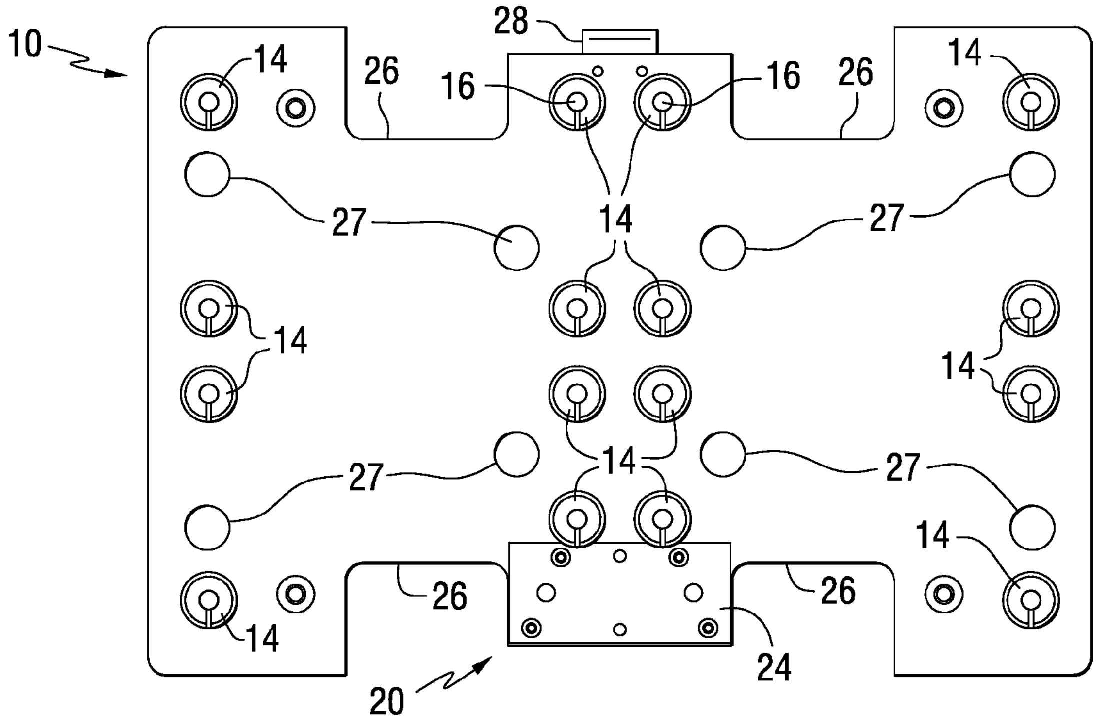
FIG. 14 is a top view.
Figure 15:
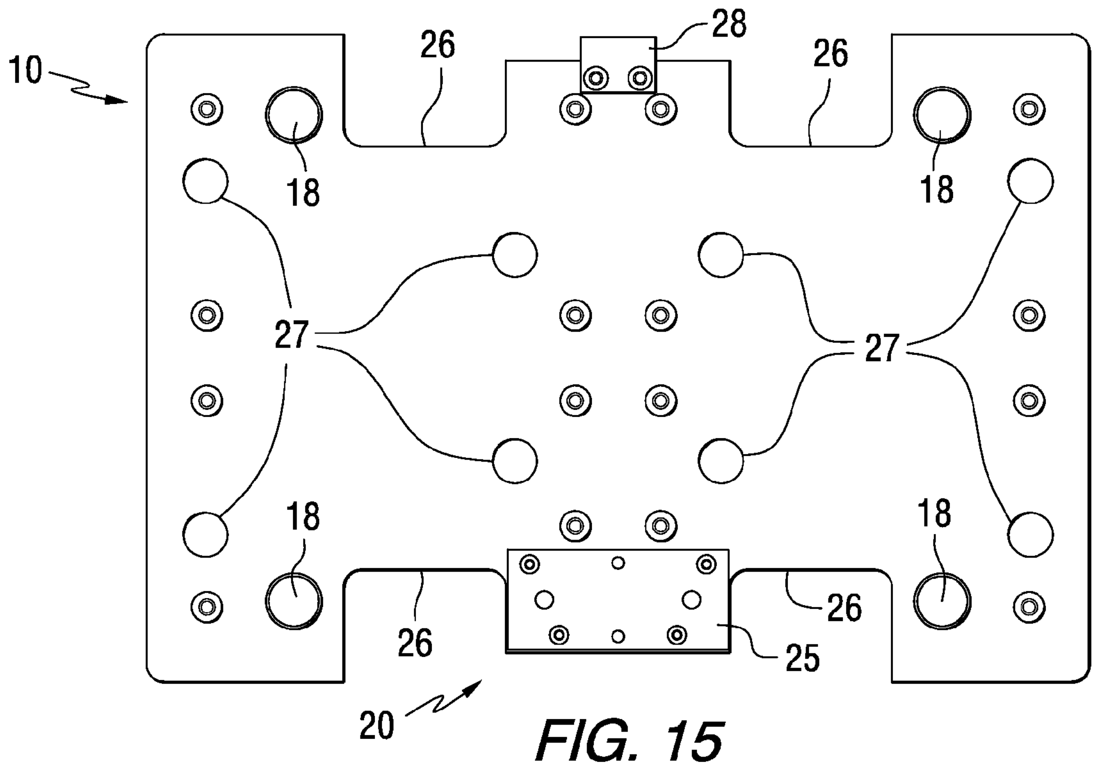
FIG. 15 is a bottom view.
Figure 16:
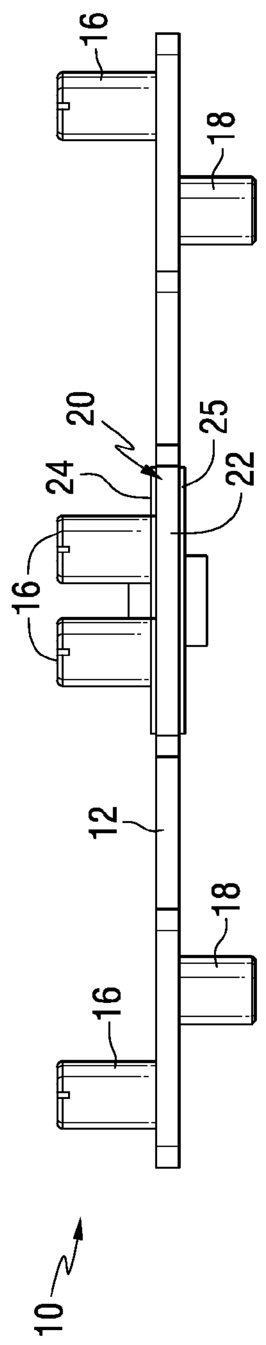
FIG. 16 is a front view.
Figure 17:
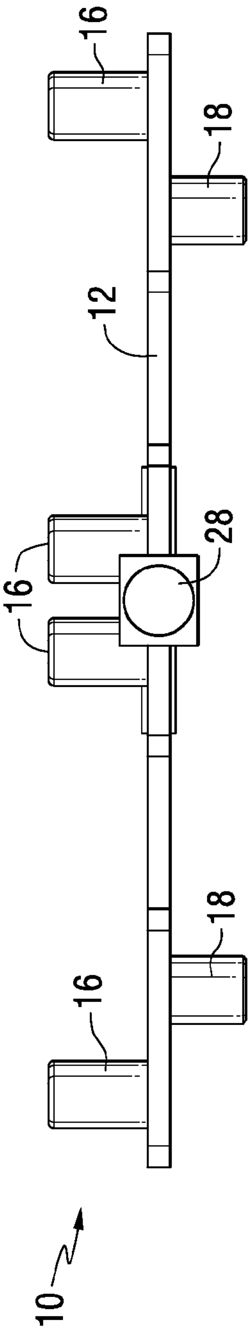
FIG. 17 is a back view.
Figure 18:
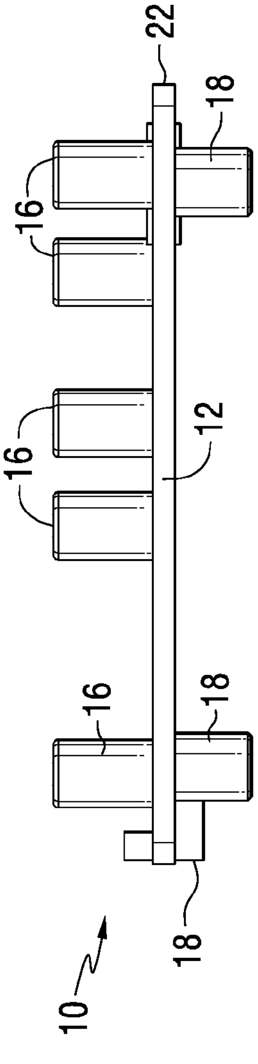
FIG. 18 is a side view of the carrier base shown in FIG. 12.
Figure 19:
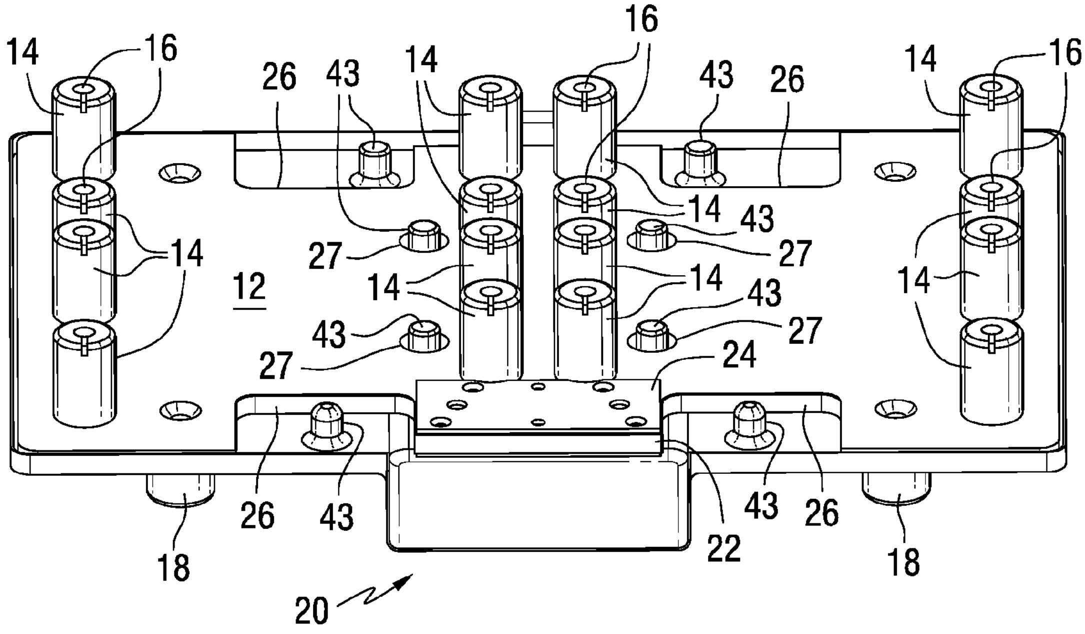
FIG. 19 is a top perspective view illustrating a carrier system in accordance with an embodiment of the invention including a carrier base and a lower protective cover, with the upper protective cover removed.

In accordance with embodiments of the invention, the grip region 20 of the carrier system 5 may be engaged by various tools such as manual or automated tooling. FIGS. 9 and 10 illustrate an example of automated manipulation of the carrier system 5 through the use of a robotic arm 50. In the embodiment shown, the robotic arm 50 includes two gripping assemblies 52 that may be mounted on opposing arms of a centrally located robotic unit (not shown). While two gripping assemblies 52 are shown in the embodiment of FIGS. 9 and 10, it is to be understood that a single gripping assembly, or more than two gripping assemblies, may alternatively be used. Each gripping assembly 52 includes opposing gripping fingers 54 and 56 operable to engage the grip region 20 of the carrier system 5. In accordance with embodiments of the invention, the grip region 20 engaged by the robotic grip fingers 54 and 56, or engaged by any other suitable tool, is protected from overspray when the carrier system 55 undergoes coating operations. Maintenance of a clean grip region 20 provides several advantages, including maintaining secure contact between the grip region and the grip tool, avoiding fouling of the grip tool and avoiding fouling of robotic tooling used to manipulate the carrier.

Figure 20:
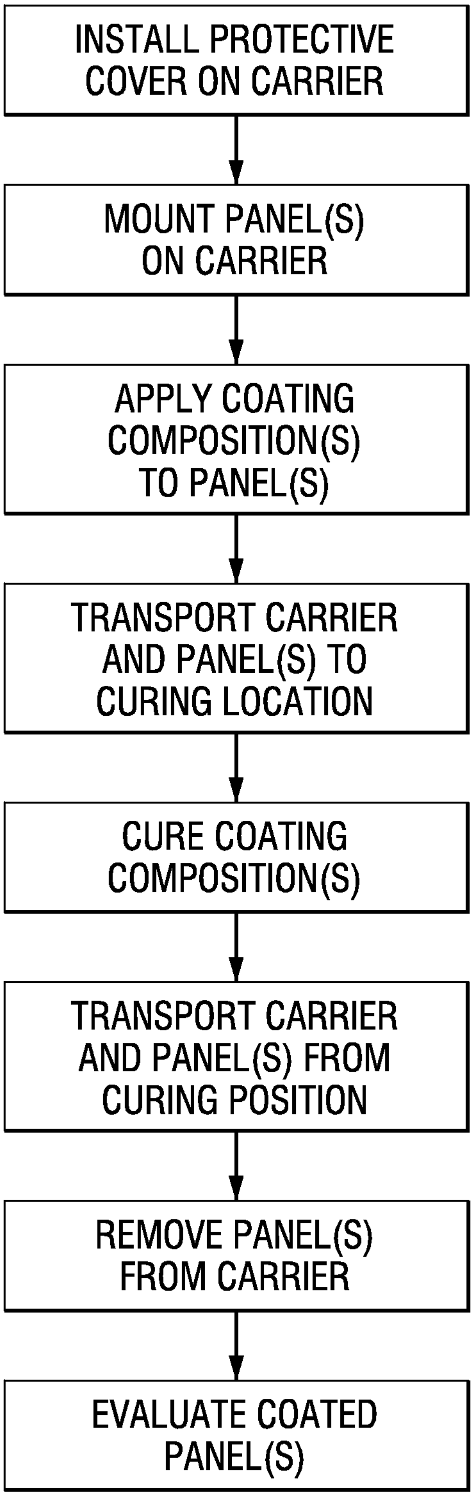
FIG. 20 is a flow diagram illustrating various steps of a panel coating process utilizing a carrier system in accordance with an embodiment of the present invention.

The flow diagram of FIG. 20 illustrates a panel coating process utilizing a carrier system in accordance with an embodiment of the invention. The steps of the process include: installing a protective cover on the carrier; mounting at least one panel on the carrier; applying a coating composition to the panel(s); transporting the carrier and panel(s) to a curing location; curing the coating composition; transporting the carrier and panel(s) from the curing position; and removing the panel(s) from the carrier. Before or after the removal step, the characteristics of the cured coating may be evaluated manually or automatically.

The protective cover may be installed on the carrier by mechanical means, such as the snap fit arrangement illustrated in the figures, or by any other suitable means such as magnets, adhesives and the like. The panels may be mounted on the covered carrier through the use of magnets or any other suitable fastening means such as mechanical fasteners, adhesives, and the like. After the panels are mounted on the carrier, at least one coating composition is applied to the panels. The same or different coating composition may be applied to each of the multiple panels. Furthermore, each individual panel may have a single coating composition or multiple coating compositions applied thereto. Any suitable coating composition may be applied to the panels in accordance with the present invention. For example, some suitable solvent-based coating compositions include isocyanate hydroxyl, epoxy amine, anhydride hydroxyl, acrylate, acrylic/CAB, alkyd, acetylacetonate ketamine, acrylic lacquer, vinyl butylaldehyde, epoxy/acid, melamine hydroxyl, silane and the like. Some suitable water-based compositions include isocyanate hydroxyl, epoxy amine, acrylic latex, melamine hydroxyl and the like.

The coating compositions may be applied by any suitable method such as spraying, rolling, brushing, blade coating, spin coating and the like.

After the coating composition(s) are applied, the carrier and panels may be transported to a flash location and/or a curing location. The carriers with the affixed coated panels may be moved out of the sprayer or other application area by a shuttle system utilizing a robotic arm that grasps the carrier and moves it to a slide mechanism or other support structure. The entire carrier may remain on the support structure for a specified flash time before the carrier is moved to a cure area. In certain embodiments, the curing location may be inside an oven or in proximity to a radiant heat source. In addition to heat curing operations, the carrier-mounted panels may be cured by other methods, such as UV curing.

In accordance with certain embodiments of the invention, the carrier and panels may be loaded into a curing oven capable of holding multiple carriers. For example, the curing oven may include multiple sliding trays that hold the carriers and panels in multiple stacked positions.

The curing temperatures and curing times may be routinely selected. For example, a typical curing procedure for an automotive refinish test panel coated with a standard refinish solvent basecoat paint system will typically have a 30 to 90 second flash, for example, a 60 second flash, followed by curing in an oven. The carrier and panels may remain in the cure oven for at least 2 or 3 minutes, or more. For example, cure times of from 10 to 20 minutes may be used. Any suitable flash temperature may be used, for example, from 50 to 80° C. or from 60 to 70° C. Any suitable cure temperature may be used, for example, from 55 to 85° C. or from 65 to 75° C. In accordance with embodiments of the invention, the protective covers 30 and 40 are capable of withstanding such curing temperatures and times without melting, deforming, or other degradation.

After the curing operation, the carrier and panels are removed and transported from the curing location, followed by removal of the panels from the carrier. The carrier and panels may be removed and transported from the curing oven by reversing the loading steps described above. The panels may be removed from the carrier via a robot arm with a vacuum tool attachment (not shown). The tool may be placed on the coated surface of the panel with a suction cup at each corner, such that any marring will not interfere with the quality of the painted surface. The vacuum may be applied at a sufficient level to remove the panel from the carrier magnets. The panel may then be placed on a cooling nest by the robot arm.

After the panels are removed from the carrier, they may be evaluated. For example, manual or automated spectrophotometer measurements may be made. In certain embodiments, quality control measurements may be made with a three-axis device which presents the painted panel surface to a spectrophotometer in a selected orientation and measurement map. For example, multiple measurements at different orientations may be made. In certain embodiments, when the measurements are completed, a robot may move each panel to a label system where the panel will have an appropriate label affixed. The labeled panel may then be placed in a rack, protecting the paint surface. In an embodiment of the invention, an automated process may be provided which tracks a particular panel, its coating formulation, and associated reflectance or other characteristics, and uploads or otherwise stores such information in a database for various uses.

For purposes of this detailed description, it is to be understood that the invention may assume various alternative variations and step sequences, except where expressly specified to the contrary. Moreover, unless otherwise indicated, all numbers expressing quantities used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A carrier for coating panels comprising: a base including at least one support pedestal structured and arranged to support a panel, and a grip region; and a protective cover contacting the base comprising a protective enclosure located above an upper surface of the grip region or below a lower surface of the grip region.

2. The carrier of claim 1, wherein the base is substantially planar and the at least one support pedestal extends from the base in a direction substantially perpendicular to the plane of the base.

3. The carrier of claim 1, wherein the at least one support pedestal comprises a magnet adjacent a distal end thereof for securing the panel to the carrier.

4. The carrier of claim 1, comprising at least two of the support pedestals for supporting the panel.

5. The carrier of claim 1, wherein the base is substantially planar and the grip region comprises a planar surface oriented in a plane substantially parallel with the plane of the base.

6. The carrier of claim 5, wherein the grip region comprises a tongue extending from an edge of the base.

7. The carrier of claim 6, wherein the tongue is at least partially covered by a wear-resistant material.

8. The carrier of claim 1, wherein at least a portion of the protective cover is self-supporting.

9. The carrier of claim 1, wherein the protective enclosure is self-supporting.

10. The carrier of claim 9, wherein the protective enclosure is located above the upper surface of the grip region.

11. The carrier of claim 9, wherein the protective enclosure is located below the lower surface of the grip region.

12. The carrier of claim 9, wherein the protective enclosure is located above the upper surface of the grip region and below the lower surface of the grip region.

13. The carrier of claim 9, wherein the protective enclosure comprises a front edge extending beyond a front edge of the base.

14. The carrier of claim 9, wherein the protective enclosure is structured and arranged to receive a robotic gripping tool.

15. The carrier of claim 1, wherein the protective cover covers at least a portion of an upper surface of the base.

16. The carrier of claim 15, wherein the protective cover covers the at least one support pedestal.

17. The carrier of claim 1, wherein the protective cover covers at least a portion of a lower surface of the base.

18. The carrier of claim 1, wherein the protective cover comprises an upper cover mounted over an upper surface of the base, and a lower cover mounted over a lower surface of the base.

19. The carrier of claim 18, wherein the upper and lower covers are detachably engageable with each other.

20. The carrier of claim 19, wherein one of the upper or lower covers comprises at least one attachment peg, the other of the upper or lower covers comprises a peg recess, and the attachment peg and recess are structured and arranged for engagement with each other when the upper and lower covers are mounted on the base.

21. The carrier of claim 20, wherein the base comprises at least one peg hole through which the at least one attachment peg extends.

22. The carrier of claim 20, wherein the base comprises at least one cut out edge adjacent the at least one attachment peg.

23. The carrier of claim 1, wherein the protective cover comprises a thermoset or thermoplastic polymer.

24. The carrier of claim 1, wherein the protective cover is disposable.

25. The carrier of claim 1, wherein the protective cover is reusable.

26. The carrier of claim 1, further comprising at least one of the panels mounted on the carrier.

27. The carrier of claim 1, further comprising at least two of the panels mounted on the carrier.

28. The carrier of claim 1, further comprising a radio frequency identification tag mounted on the carrier.

29. A protective cover for a coating panel carrier comprising a self-supporting protective enclosure comprising opposing upper and lower covers structured and arranged to contact a base of the carrier and to cover a grip region of the carrier.

30. The protective cover of claim 29, wherein the protective cover comprises a substantially planar base portion, and the upper cover of the protective enclosure is located above the base portion.

31. The protective cover of claim 29, wherein the protective cover comprises a substantially planar base portion, and the protective enclosure comprises a bottom panel located below the base portion.

32. The protective cover of claim 29, wherein the opposing upper and lower covers are detachably engageable with each other.

33. The protective cover of claim 29, wherein the protective cover comprises a thermoset or thermoplastic polymer.

34. The protective cover of claim 29, wherein the protective cover is disposable.

35. The protective cover of claim 29, wherein the protective cover is reusable.

36. A method of coating panels comprising: mounting at least one panel on a carrier of claim 1 having a protective cover; applying a coating composition to the at least one panel; and curing the coating composition while the at least one panel is mounted on the carrier.

37. The method of claim 36, wherein the protective cover comprises a protective enclosure that protects a grip region of the carrier when the coating composition is applied to the at least one panel.

38. The method of claim 37, wherein the coating composition is applied to the at least one panel by spraying, and the protective enclosure protects the grip region of the carrier from overspray.

39. The method of claim 36, further comprising detachably installing the protective cover on the carrier prior to the step of mounting the at least one panel on the carrier.

40. The method of claim 36, further comprising: gripping the carrier with a robotic arm; placing the carrier and at least one mounted panel in a coating spray position with the robotic arm; applying the coating composition to the at least one panel by spraying; and removing the carrier and at least one mounted panel from the coating spray position with the robotic arm.

41. The method of claim 40, further comprising disengaging the robotic arm from the carrier during the spraying step.

42. The method of claim 36, further comprising transporting the carrier and at least one panel to a curing location prior to the curing step.

43. The method of claim 42, further comprising flashing the coating composition before the carrier and at least one panel are transported to the curing location.

44. The method of claim 36, further comprising transporting the carrier and at least one panel from the curing location to an evaluation location.

45. A carrier for coating panels comprising: a substantially planar base including at least one support pedestal structured and arranged to support a panel, and a grip region comprising a planar surface oriented in a plane substantially parallel with the plane of the base, wherein the grip region comprises a tongue extending from an edge of the base; and a protective cover contacting the base of the carrier and comprising a protective enclosure adjacent the grip region.

46. A carrier for coating panels comprising: a base including at least one support pedestal structured and arranged to support a panel, and a grip region; and a protective cover contacting the at least one support pedestal comprising a protective enclosure adjacent of the grip region, wherein the protective enclosure comprises a front edge extending beyond a front edge of the base.

47. A carrier for coating panels comprising: a base including at least one support pedestal structured and arranged to support a panel, and a grip region; and a protective cover comprising a protective enclosure adjacent the grip region, wherein the protective cover comprises an upper cover contacting an upper surface of the base, and a lower cover contacting a lower surface of the base.

48. A protective cover for a coating panel carrier comprising a self-supporting protective enclosure structured and arranged to cover a grip region of the carrier, wherein the protective cover comprises a substantially planar base portion structured and arranged to contact a lower surface of the carrier, and the protective enclosure comprises a bottom panel located below the base portion.

49. A carrier for coating panels comprising: a base including at least one support pedestal structured and arranged to support a panel, and a grip region; and a protective cover comprising a protective enclosure located above an upper surface of the grip region or below a lower surface of the grip region, wherein the protective cover comprises a thermoset or thermoplastic polymer.

* * * * *